(12) United States Patent
Perry (10) Patent No.: US 8,397,852 B1
(45) Date of Patent: Mar. 19, 2013

(54) MULTIPLE-MODE VEHICLE POWER SYSTEM

(76) Inventor: Raymond Earl Perry, Selma, NC (US)

(*) Notice: Subject to any disclaimer, the term of this patent is extended or adjusted under 35 U.S.C. 154(b) by 960 days.

(21) Appl. No.: 10/907,592

(22) Filed: Apr. 7, 2005

Related U.S. Application Data (63) Continuation-in-part of application No. 10/032,055, filed on Jan. 4, 2002, now abandoned.

(60) Provisional application No. 60/302,625, filed on Jul. 3, 2001.

(51) Int. Cl.
*B60K 11/04* (2006.01)

(52) U.S. Cl. ........................ 180/68.4; 180/165

(58) Field of Classification Search .............. 180/65.1, 180/65.2, 65.3, 68.2, 68.3, 2.1, 2.2, 65.4, 180/165; 123/2, 22, 41.01, 41.49, 41.56, 123/41.65
See application file for complete search history.

(56) References Cited

U.S. PATENT DOCUMENTS

| | | | | |
|---|---|---|---|---|
| 1,995,935 A * | 3/1935 | Marks et al. | ............... | 123/559.1 |
| 2,756,026 A * | 7/1956 | Myrent et al. | ............... | 165/288 |
| 3,379,008 A | 4/1968 | Manganaro | ............... | 60/57 |
| 3,444,946 A | 5/1969 | Waterbury | ............... | 180/65 |
| 3,696,730 A | 10/1972 | Masuda et al. | ............... | 98/2.06 |
| 3,878,913 A | 4/1975 | Lionts et al. | ............... | 180/65 |
| 3,980,152 A | 9/1976 | Manor | ............... | 180/66 |
| 4,002,218 A | 1/1977 | Horvat | ............... | 180/65 |
| 4,168,759 A | 9/1979 | Hull et al. | ............... | 180/65 |
| 4,173,951 A | 11/1979 | Ishihara | ............... | 123/2 |
| 4,186,693 A | 2/1980 | Thien et al. | ............... | 123/41.12 |
| 4,214,652 A | 7/1980 | Quenneville | ............... | 192/58 |
| 4,254,843 A | 3/1981 | Han et al. | ............... | 180/165 |
| 4,383,589 A | 5/1983 | Fox | ............... | 180/165 |
| 4,423,368 A | 12/1983 | Bussiere | ............... | 322/35 |
| 4,453,524 A | 6/1984 | Lee | ............... | 123/556 |
| 4,539,942 A | 9/1985 | Kobayashi et al. | ............... | 123/41.1 |
| 4,632,205 A * | 12/1986 | Lewis | ............... | 180/165 |
| 4,651,922 A * | 3/1987 | Noba | ............... | 236/35 |
| 4,726,324 A * | 2/1988 | Itakura | ............... | 123/41.1 |
| 4,763,751 A | 8/1988 | Gardner, Jr. | ............... | 180/305 |
| 5,141,173 A | 8/1992 | Lay | ............... | 244/2 |
| 5,142,868 A * | 9/1992 | Woon et al. | ............... | 60/624 |
| 5,287,004 A | 2/1994 | Finley | ............... | 290/55 |
| 5,460,239 A | 10/1995 | Jensen | ............... | 180/302 |
| 5,947,248 A | 9/1999 | Link | ............... | 192/84.1 |
| 6,055,946 A * | 5/2000 | Dombek et al. | ............... | 123/41.11 |
| 6,138,781 A | 10/2000 | Hakala | ............... | 180/2.2 |
| 6,223,843 B1 | 5/2001 | O'Connell et al. | ............... | 180/65.3 |
| 6,230,695 B1 | 5/2001 | Coleman et al. | ............... | 123/568.12 |
| 6,276,473 B1 | 8/2001 | Zur Megede | ............... | 180/65.2 |
| 6,306,057 B1 | 10/2001 | Morisawa et al. | ............... | 475/5 |
| 6,311,495 B1 | 11/2001 | Shimizu et al. | ............... | 60/718 |
| 6,316,842 B1 | 11/2001 | Kuroda et al. | ............... | 290/40 |
| 6,373,145 B1 | 4/2002 | Hamrick | ............... | 290/44 |
| 6,766,774 B1 * | 7/2004 | Kussmann | ............... | 123/41.48 |

FOREIGN PATENT DOCUMENTS

JP 01266066 A * 10/1989

* cited by examiner

Primary Examiner — J. Allen Shriver, II
Assistant Examiner — Bridget Avery
(74) Attorney, Agent, or Firm — Ishman Law Firm P.C.

(57) ABSTRACT

A vehicle power system includes a constant speed internal combustion engine coupled with an electrical generator for powering an electric motor coupled to the vehicle drive train. An air assist system also coupled to the drive train supplements the electric motor. The air assist system includes an air fan powered by diverted air flow during vehicle travel and by an engine driven air compressor during low vehicle speeds.

33 Claims, 6 Drawing Sheets

MULTIPLE-MODE VEHICLE POWER SYSTEM

RELATED APPLICATIONS

This application claims the benefit under 35 USC 119 of U.S. Provisional Application No. 60/302,625 filed on Jul. 3, 2001 in the name of Raymond Perry and entitled "Vehicle Power System" and is a continuation in part application of U.S. application Ser. No. 10/032,055 filed on Jan. 4, 2002 now abandoned in the name of Raymond Perry and entitled "Multiple Mode Vehicle Power System.

FIELD OF THE INVENTION

The present invention relates generally to power systems for vehicles and, in particular, to a multiple power source system for propelling vehicles.

BACKGROUND OF THE INVENTION

Most vehicles derive power from an internal combustion engine transferred to the drive wheels by a power train. In hybrid approaches, the engine power may be supplemented by auxiliary sources such as electrical power. For example, U.S. Pat. No. 6,316,842 to Kuroda et al. discloses a vehicle powered by both an internal combustion engine and an electric motor. A similar approach is disclosed in U.S. Pat. No. 6,306,057 to Morisawa et al. Further, fuel cells have been disclosed for supplementing or alternating electrical power to the engine as disclosed in U.S. Pat. Nos. 6,223,843 to O'Connell et al. and 6,276,473 to Zur Megede. Energy storing flywheels, coupled with an internal combustion engine, have been disclosed in U.S. Pat. No. 6,311,495 to Shimizu et al.

The present invention, rather than using variable speed engine power and electric power as co-joint or separate prime movers, uses a constant speed engine only to operate an electric motor. The electric motor and an air fan powered by diverted airstreams during vehicle travel are both coupled through a drive train and transmission to the driving wheels. The resultant combination allows the engine to operate at efficient speed ranges for supplying electrical power and the power generated at the air fan to supplement power during vehicle travel, thereby providing substantially increased fuel efficiencies.

SUMMARY OF THE INVENTION

More particularly, one aspect of the present invention provides a multiple mode vehicle power system based on gas, air, generator and electric motor inputs (GAGE). Therein an internal combustion engine operating at a governed speed, high efficiency mode operates an electrical generator for providing power to an electric motor coupled to the vehicle drive chain. A power assist fan also coupled to the drive chain is powered by diverted air flow from an air compressor operated by the engine, and diverted air streams captured and directed by peripheral air intakes on the vehicle body. Exhaust flow from the fan is enhanced by controlled airflow over the rear of the vehicle body. A control system modulates operation of the engine and fan assist for maximizing fuel efficiency.

Another aspect of the invention provides a multiple mode vehicle power system wherein fan means in an air intake at the front of the vehicle are rotatably coupled to the crankshaft of an internal combustion engine for providing supplemental power to the crankshaft during vehicle travel.

DESCRIPTION OF THE DRAWINGS

The above and other objects and advantages of the present invention will become apparent upon reading the following detailed description, taken in conjunction with the accompanying drawings in which.

DETAILED DESCRIPTION OF THE PREFERRED EMBODIMENT

Figure 1:
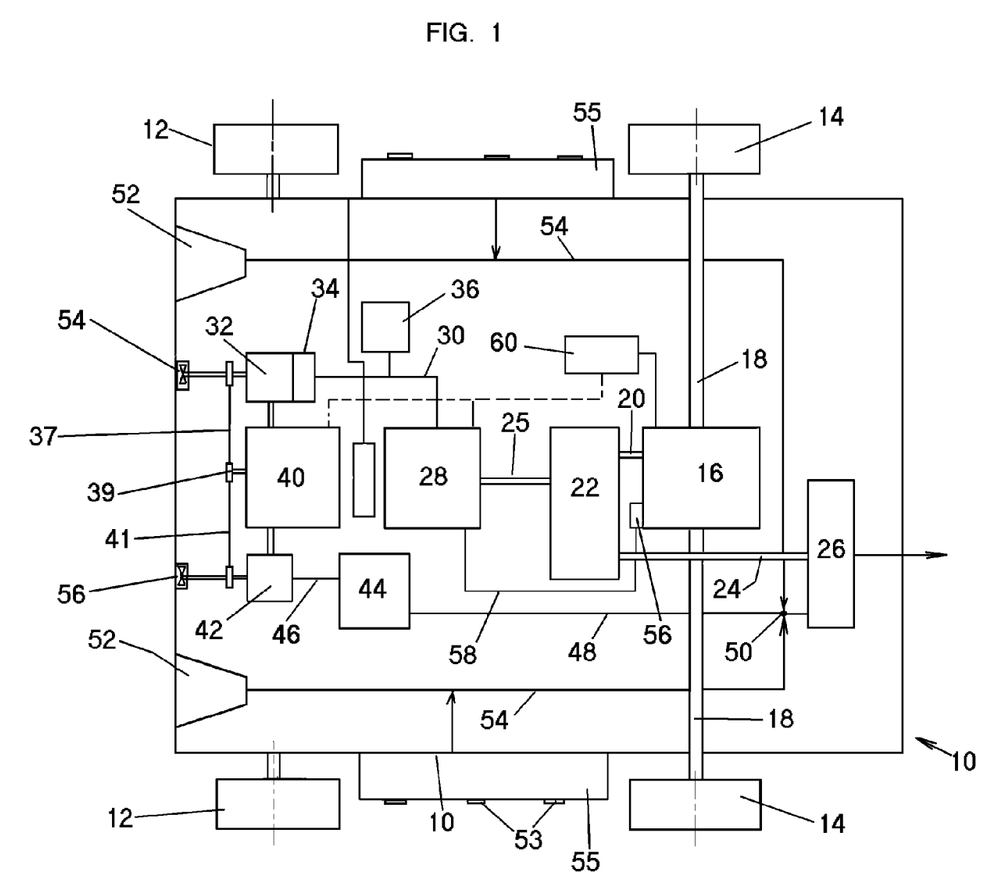
FIG. 1 is a schematic drawing of a motor vehicle incorporating a power system in accordance with an embodiment of the invention.

Referring to the drawings for purposes of describing the preferred embodiment only and not for limiting same, FIG. 1 schematically illustrates a motor vehicle 10 having steerable front wheels 12 and rear wheels 14 drivingly connected to a conventional differential and transmission unit 16 for transferring power from multiple sources as described below. The unit 16 includes output shafts 18 rotatably and drivingly connected with the rear wheels 14. While illustrated for a rear wheel drive vehicle, it will be hereinafter apparent that the drive system is similarly applicable to front and all-wheel drive vehicles.

The transmission unit 16 has an input shaft 20 operatively connected to the output of a power transfer gear unit 22. The gear unit 22 has input shafts 24, 25 operatively connected with an air assist fan 26 and an electric motor 28, respectively.

The electric motor 28 has an input line 30 connected in parallel with a generator 32 and power regulator 34, and a backup rechargeable battery unit 36. The generator 32 is drivingly connected by drive belt 37 to a crankshaft pulley of an internal combustion engine 40. The drive belt ratio is selected to provide the desired input shaft speed to the generator 32. The engine 40 is preferably a high efficiency three cylinder engine and governor-regulated to operate at a constant, high efficiency speed at about the normal idling range. A desired speed range is around 600 to 1500 rpm, and preferably around 800 to 1000 rpm. The engine 40 operates the generator 32 for supplying power on demand to the electric motor 28, and for recharging the battery unit 36. The battery unit 36 provides backup power to the electric motor 28 at lower speeds.

The engine 40 is also operatively connected by drive belt 41 to an air compressor 42. The ratio at the drive belt 41 is selected for delivering selected output at the governed speed of the engine 40. A suitable compressor is a Model 400 series double head design, commonly used in air brake systems. The compressor 42 is fluidly connected with a holding tank 44 at line 46. The holding tank 44 is connected by supply line 48 to the inlet 50 of the air assist fan 26.

A fan unit 54 mounted at frontal opening on the vehicle 10 is drivingly connected with the generator 32. A fan unit 56 mounted at a second frontal opening on the vehicle 10 is drivingly connected with the air compressor 42.

A pair of air intakes 52 at the front of the vehicle 10 and side mounted air intakes 53 positioned at depending side shrouds 55 at the lower sides of the vehicle direct intake air flow through dedicated lines and/or body panel diverted ducting established by the bottom panels 57 to the inlet 50 to the air assist fan 26. Additionally, a ram air scoop 51 mounted on the hood (FIG. 2) of the vehicle is similarly ducted by firewall panel 59 and bottom panels 57 to the input of the assist fan. Air supplied from the tank 44, the intakes 52, 53 and the air scoop 51 delivers a vehicle speed dependent air flow to power the assist fan 26 for cojointly delivering power along drive line 24 to the gear unit 22.

A secondary generator 56 connected to the transmission unit 16 supplies auxiliary power to the electric motor 28 along power line 58.

An operator control system 60 is operatively connected with the transmission unit 16 for controlling gear ratios, if utilized, and forward and reverse propulsion. The control system 60 is additionally connected with the electric motor 28 and engine 40 for further modulating vehicle speed and response.

Figure 2:
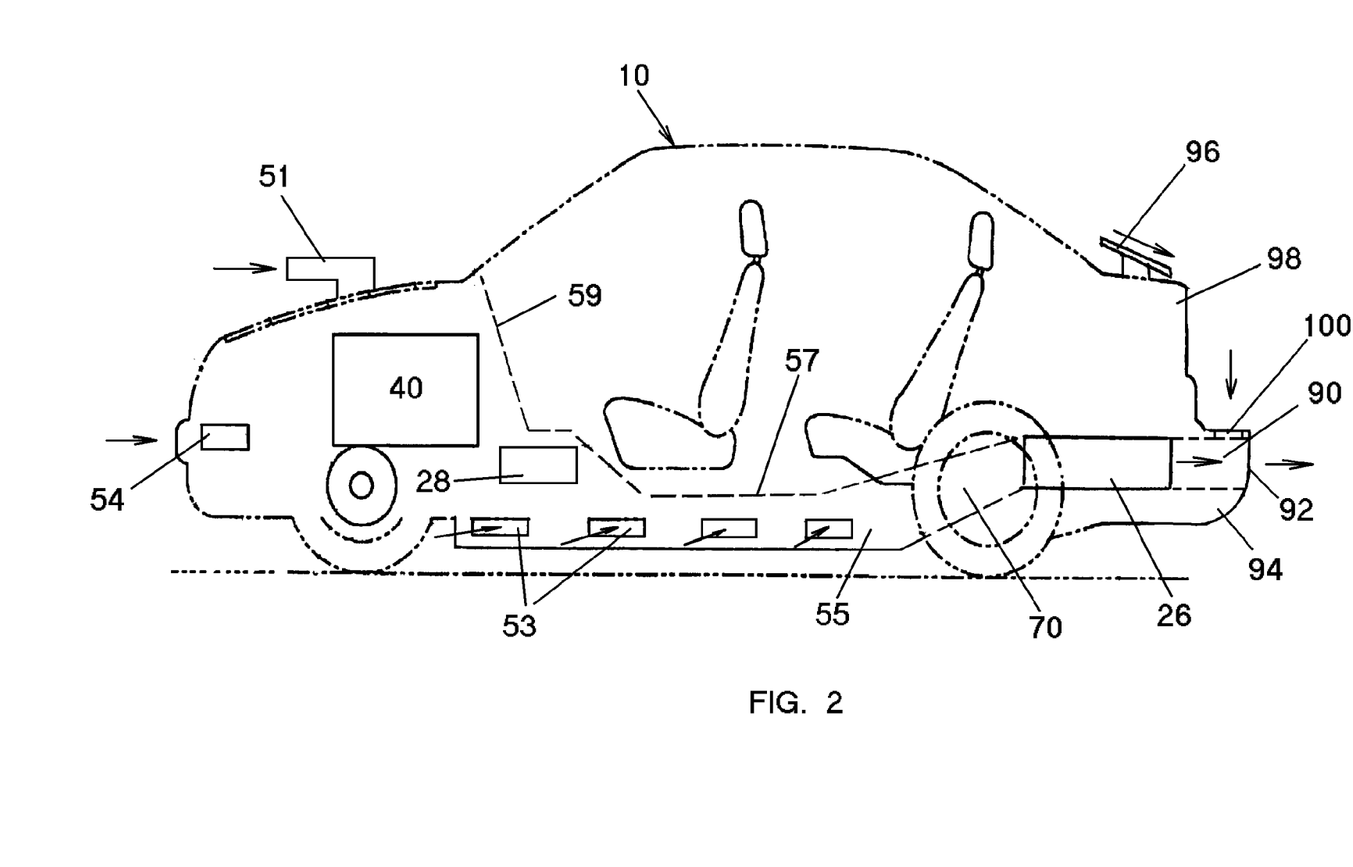
FIG. 2 is a schematic side elevational view of a motor vehicle illustrating portions of the invention.
Figure 3:
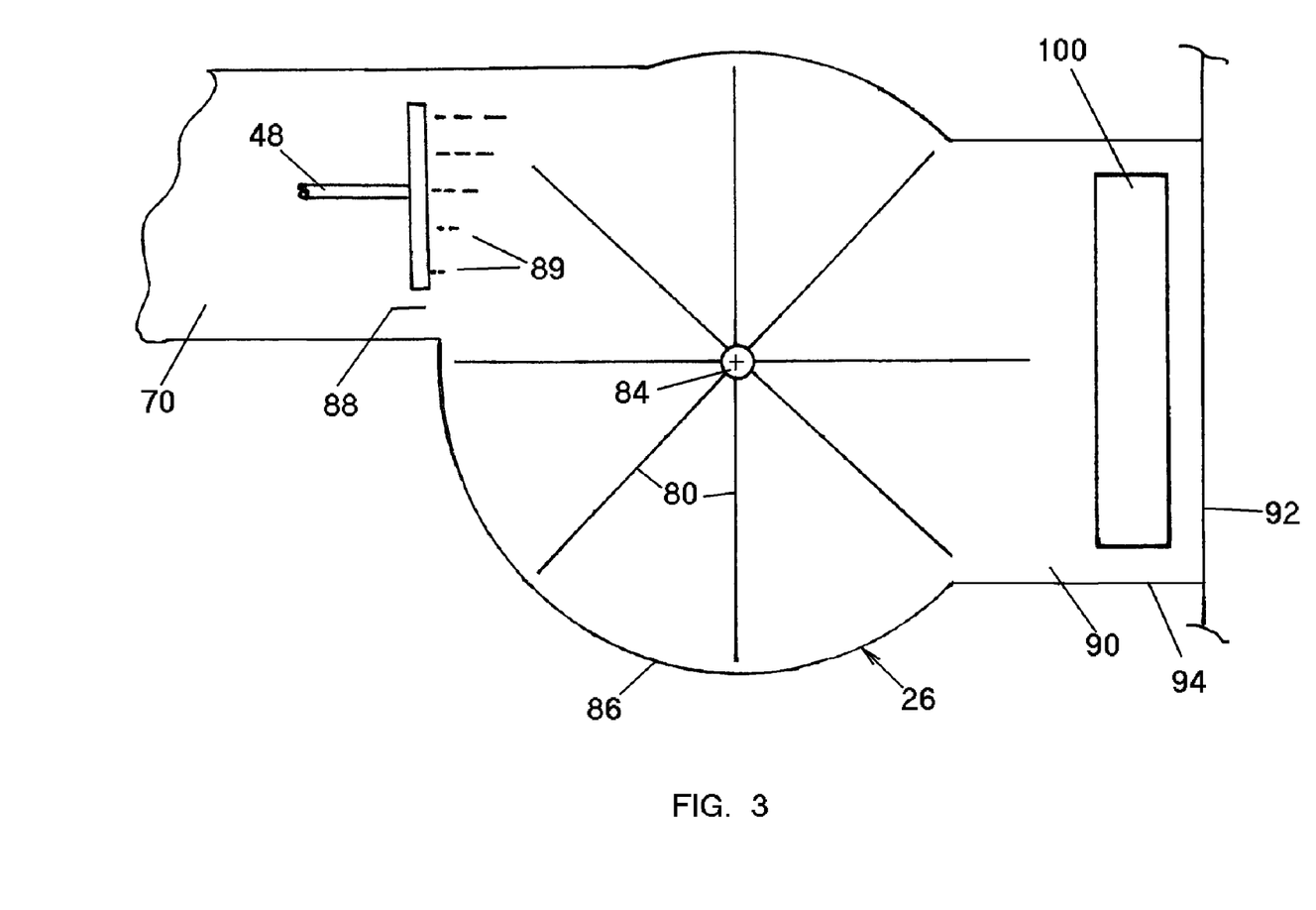
FIG. 3 is a schematic view of the fan assist system of the invention.
Figure 4:
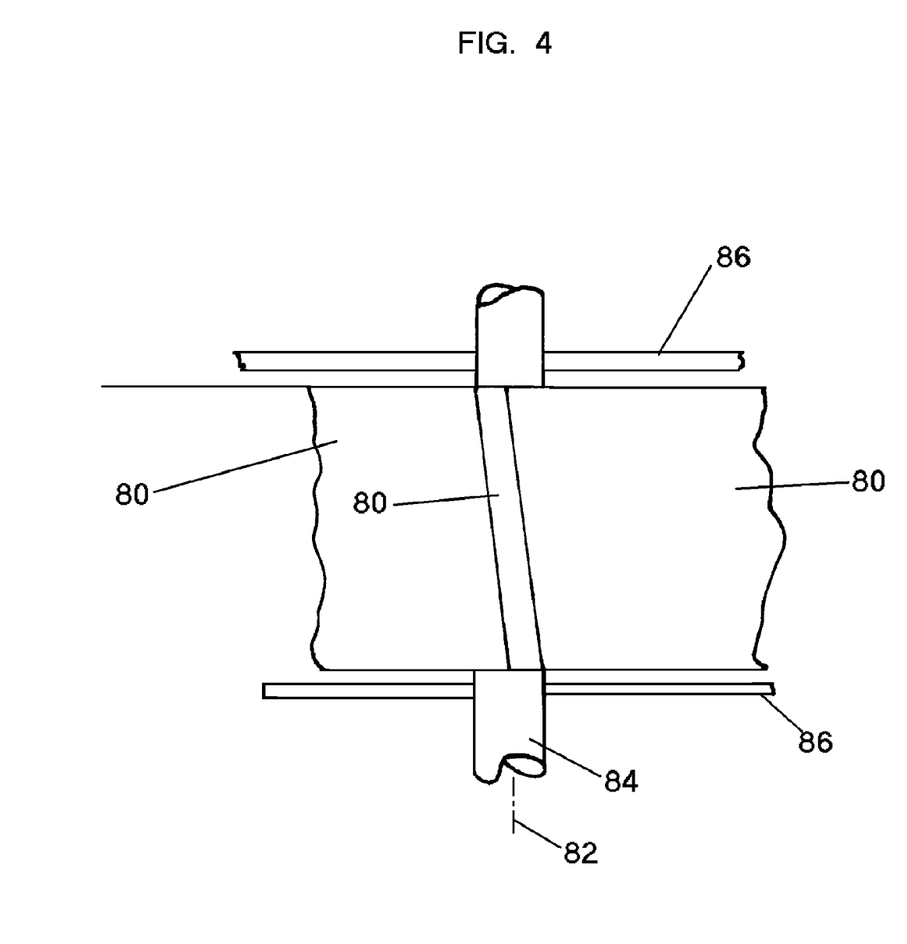
FIG. 4 is and end view of the fan vane or the assist fan.

Referring to FIGS. 2 through 4, the air intake system for the air assist fan channels the air flow admitted by the frontal and side air intakes, and the hood intake rearwardly toward the fan intake 70 through the peripheral shrouding and the lower vehicle surfaces. Preferably a portion of the airflow is directed through the electric motor 28 for cooling the same.

The air fan 26 is mounted in the rear trunk area of the vehicle. The fan 26 is provided with a plurality of radially disposed fan blades 80 slightly angularly disposed with respect to the axis of fan rotation, preferably in the range of about 2° to 15°. The axis 82 of the fan shaft 84 is vertically disposed and slightly longitudinally inclined, up to about 10° to optimize the torque to the blades 80. A fan shroud 86 surrounding the blades 80 provides a frontal radial sector opening 88 for the entering airflow. The opening 88 communicates with the sector of the fan in the direction of fan rotation. Accordingly, it will be appreciated that airflow will impart a torque at the fan blades 80, increasing with air speed and mass flow. For lower vehicle speeds, airflow from the compressor 42 is exhausted from the holding tank 44 along supply line 48 to inlet 50 for assisting fan rotation. The fan shroud 86 includes a radial outlet port 90 communicating with a rearwardly opening outlet 92 housed in a suitable location such as the rear bumper 94. To assist exhaust air venting, airflow over the top of the vehicle is directed by a downwardly inclined spoiler 96 on the trunk 98 into an upwardly opening vent 100 in the bumper 94.

In operation, power is dually supplied by the electric motor 28 and the air blower 26 to the transmission unit 16 and to the rear wheels 14 by drive shafts. As the vehicle speed increases, a greater power assist is provided by the supplemental air from the intakes 52, 53, and 55. The vehicle 10 through regulated, efficient engine speed and resultant electrical power from the generator 32 and airflow from the compressor 42, accompanied by gear selection via the control system enables the vehicle to operate at high efficiencies from the plural sources, and as required from backup supplies.

Initial prototypes of the above described multiple mode propulsion system have consistently demonstrated substantial increases in fuel economy, in the range of 150 to 250 miles per gallon of fuel, while maintaining comparable performance and handling. A recent prototype was incorporated in a 1985 BMW, and utilized a three cylinder internal combustion engine operating at a constant speed of around 1000 rpm; an 8,000 W generator to a 3 horsepower 180 VAC, 1750 rpm electric motor; a 42 inch diameter fan with a 5° blade pitch and 5° fan inclination; and a model 400 dual head air compressor. Preliminary driving results are expected to yield a fuel economy of around 200 miles per gallon.

Figure 5:
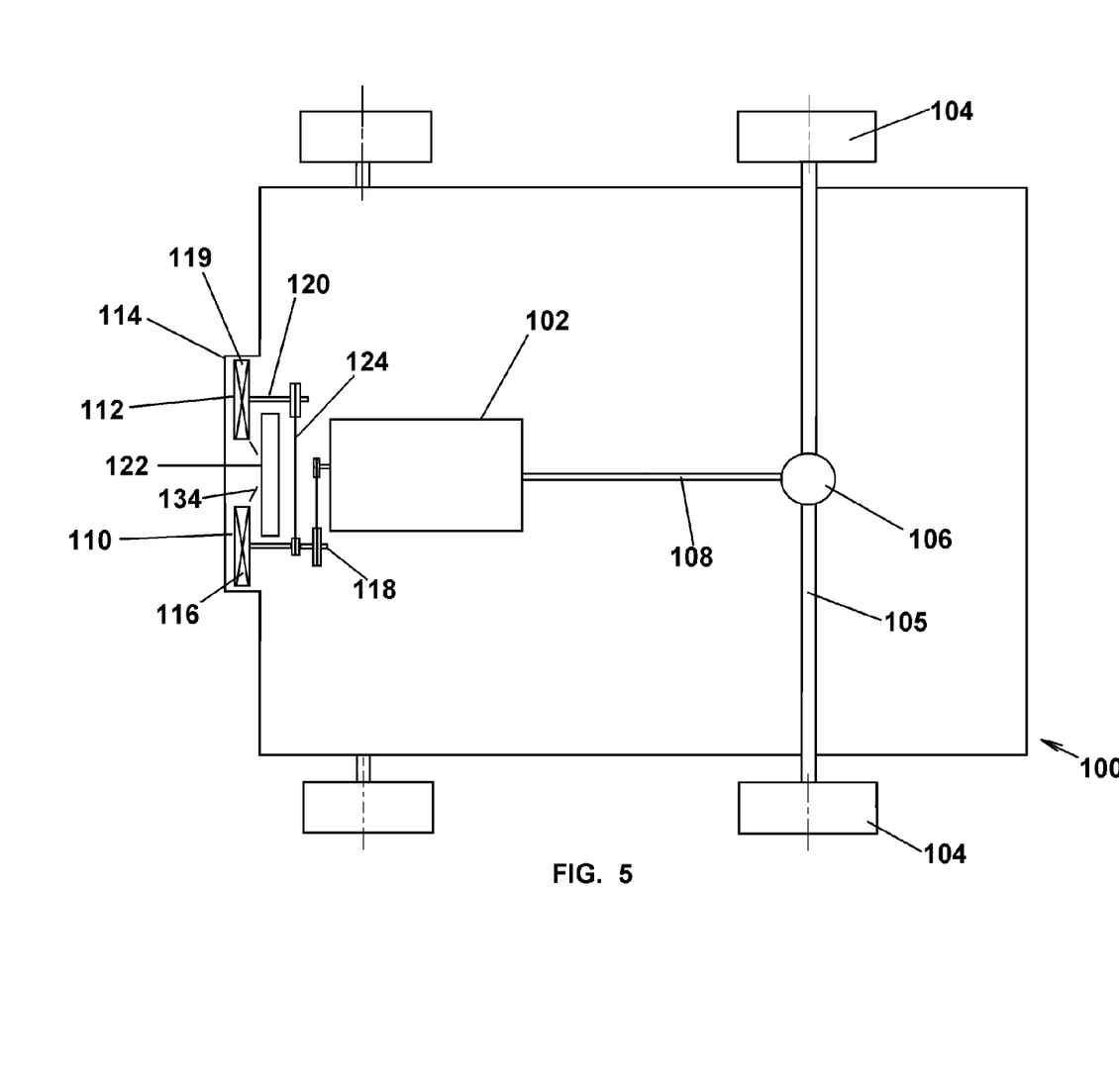
FIG. 5 is a schematic drawing of a motor vehicle incorporating a power system in accordance with another embodiment of the invention.
Figure 6:
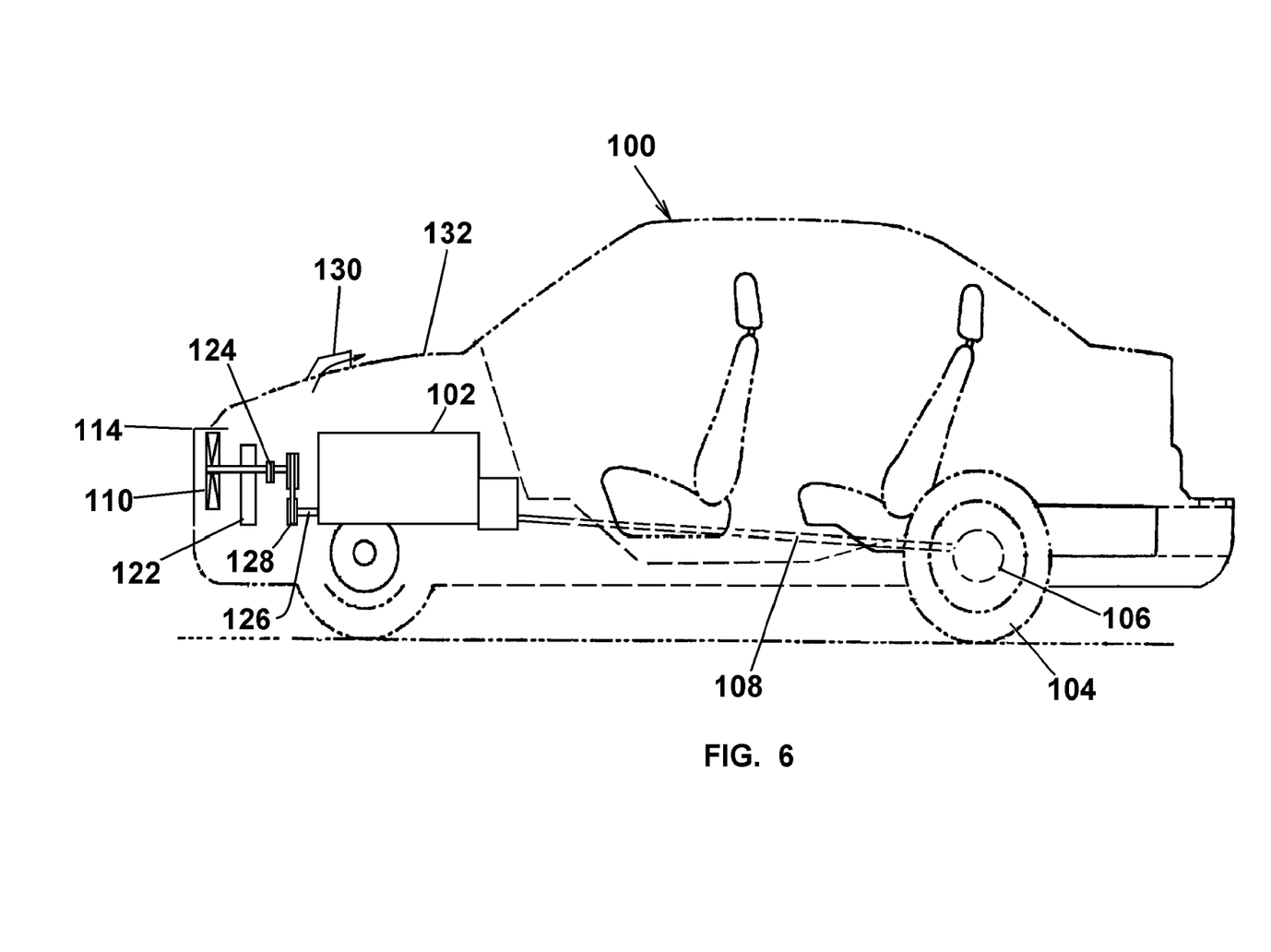
FIG. 6 is a schematic side elevational view of the vehicle of FIG. 5.

Another embodiment of the invention is shown in FIGS. 5 and 6 wherein the motor vehicle 100 comprises an internal combustion engine 102 conventionally drivingly connected to rear drive wheels 104 through output shafts 105 at differential 106 by drive shaft 108. A first front fan assembly 110 and a second front fan assembly 112 are mounted in side-by-side relation at an air intake 114 at the front of the vehicle.

The first fan assembly 110 includes first fan blades 116 mounted on a first fan shaft 118 and a second fan assembly 112 includes second fan blades 119 mounted on a second fan shaft 120. The first fan shaft 118 and the second fan shaft 120 are rotatably supported on the vehicle longitudinally in front of the engine radiator 122. The second fan shaft 120 is coupled to the first fan shaft 112 by drive means 124. The first drive shaft 118 is coupled to the crankshaft 126 of the engine by drive means 128. The drive means in the embodiment comprise belt and pulley drives, however, it will be appreciated that other coupling may be used such as gears, chain and sprocket and other systems for rotatably coupling the components. For transverse mounted engines, angular drive trains may be employed. Further, if it is desired to disable the system, such as at lower vehicle speeds, clutching systems may be employed. To assist outlet flow from the fans and the engine compartment under lower vehicle speed operation on an existing vehicle, a vent outlet 130 may be provided on the hood 132. The outlet may be fan assisted. At higher vehicle speeds, adequate outlet flow is present. Passive ducting may alternatively be provided. A deflector 134 may be provided to direct fan outlet air flow to the radiator 122 permitting removal of the conventional radiator fan located behind the radiator.

The drive ratios between the rotational speed of the fans and the crankshaft are selected in accordance with vehicle performance and fuel efficiency considerations. Based on vehicle testing, it has been found desirable to operate the fan speed at less than the crankshaft speed, inasmuch as when the fan speed approaches crankshaft speed, wind gusts can generate enough momentary torque to cause an unintended vehicle speed increase. It has also been determined based on vehicle testing that a lower driven fan speed and increased fan speed/crankshaft drive ratio will increase the supplemental torque delivered to the crankshaft by the fans. The supplemental torque may be also increased by a step down ratio between the driving fan and the driven fan. By way of example, in an operative embodiment, the drive means between the crank shaft and the driving fan shaft uses a 10 inch pulley on the first fan shaft and a 1½ inch pulley on the crankshaft, producing 10:3 crankshaft/fan shaft ratio and a corresponding increase in the torque delivered by the first fan to the crankshaft. The drive means between the second fan and the first fan uses a 6 inch pulley on the second fan shaft and a 1½ inch pulley on the first fan shaft producing a 3:1 first fan shaft/second fan shaft drive ratio, a corresponding increase in the torque delivered by the second fan to the first fan shaft, and a compound increase to the crankshaft of 40:4.5. Actual vehicles equipped with a front fan system in accordance with the foregoing achieve a significant fuel efficiency increase in fuel mileage, increased top speed, and improved acceleration in comparison with the same vehicle with the front fan system disable under comparable driving conditions According to the current best explanation for the above benefits, it appears that the frontal fan assemblies accept a portion of the frontal wind force without significantly increasing the frontal drag force. Accordingly, the driving torque required to maintain a given speed is also not significantly affected. With the frontal fan system disabled, the entire driving torque is supplied by the engine. With the fan system enabled, at a given vehicle speed, the fans deliver a torque to their respective fan shafts in accordance with the fan configuration, reducing the amount of torque required by the engine to maintain speed and reducing the engine fuel requirements. The fan torque is delivered to the crankshaft in accordance with drive ratios. Inasmuch as the fan torque is a factorial of wind speed, the supplemental torque increases geometrically with vehicle speed. Thus at highway speeds, the fan system is able to deliver a significant portion of the required road torque and provide increased fuel efficiency as set forth in the following example.

Example 1

A 1994 Chevrolet Geo Tracker with a 1.6 internal combustion engine and a 5-speed manual transmission was provided with a frontal fan system in accordance with the embodiment of FIGS. 5 and 6. The fans were mounted in an inlet at the front of the vehicle in side-by-side relationship. Each fan comprised five 14-inch right hand fans blades with a 45° angle. The left side fan was mounted on a shaft including a 10-inch pulley operatively connected with the engine crankshaft by a belt at a three-inch pulley. The right side fan included a 6-inch pulley operatively connected with the left side fan shaft by a belt at a 1½ pulley. The engine and drive train of the vehicle had not been modified, and that the vehicle odometer indicated total vehicle mileage of around 135,000 miles. In a Test Condition 1, the fan belts were disconnected. At a starting location, the vehicle was filled with gas to automatic shutoff, and the trip odometer of the vehicle was reset. The vehicle was then driven on an interstate highway over a course of 245 miles. Upon return to the starting location, the vehicle was refilled to automatic cutoff in the amount of 10.7 gallons. Promptly thereafter, the fan belts were connected between the fans and the crankshaft for Test Condition 2 and the trip odometer was reset. Immediately thereafter, in similar environment conditions, the vehicle in Test Condition 2 was driven over the same closed of 245 miles, duplicating to the extent possible the driving conditions of Test Condition 1. Upon return to the starting location, the vehicle was refilled with gas to automatic shutoff in the amount of 7.0 gallons. In Test Condition 1, the vehicle operated at 22.9 miles per gallon. In Test Condition 2, the vehicle operated at 35.0 miles per gallon, or a 54.8% increase.

While the invention has been described with particular reference to passenger vehicles, the benefits may be obtained by the range of motorized vehicles. Trucks, for instance may incorporate the frontal fans at front intakes. Larger trucks may incorporate the fans on top of the cab with belt or geared transmission to the engine.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claim.

What is claimed is:

1. A vehicle power system, comprising: a vehicle having drive wheels; internal combustion means carried by said vehicle; electrical generation means operatively connected to said internal combustion means; air flow generation means operatively connected to said internal combustion means; first fan means carried rearwardly on said vehicle and fluidly connected to said air flow generation means; air intake means on the vehicle fluidly connected to said first fan means; electric motor means electrically connected to said electrical generation means, said air intake means including inlets mounted at the front of the vehicle and fluidly connected with said first fan means by side surfaces and lower surfaces of said vehicle, said side surfaces including depending shroud members extending below said lower surfaces of said vehicle, and including a plurality of inlet openings therein; and power transfer means having an output operatively connected to drive wheels of the vehicle and an input operatively connected to said electric motor means and said air flow means.

2. The vehicle power system as recited in claim 1 including an air inlet positioned on the hood of the vehicle.

3. The vehicle power system as recited in claim 1 wherein said first fan means comprise a plurality of fan blades rotatable about an axis transverse to the longitudinal axis of said vehicle.

4. The vehicle power system as recited in claim 1 wherein including an upwardly opening inlet on said outlet for said first fan means, and an included air diverting surface carried at the rear of said vehicle for directing airflow to said opening for enhancing airflow through said first fan means.

5. The vehicle power system as recited in claim 1 wherein said vehicle includes a differential operatively connected with said rear wheels and including a gear unit having inputs operatively connected to said electric motor and said fan means and an output connected with said differential.

6. The vehicle power system as recited in claim 1 including air flow generation means operatively connected to said internal combustion means.

7. The vehicle power system as recited in claim 1 wherein speed regulating means are operatively associated with said internal combustion means for maintaining a substantially constant speed therefor.

8. The vehicle power system as recited in claim 1 wherein including an upwardly opening inlet for said first fan means, and an inclined air diverting surface carried at the rear of said vehicle for directing airflow to said opening for enhancing airflow through said first fan means.

9. The vehicle power system as recited in claim 1 wherein said vehicle includes a differential operatively connected with said rear wheels and including a gear unit having inputs operatively connected to said electric motor and said fan means and an output connected with said differential.

10. The vehicle power system as recited in claim 3 wherein said fan blades are slightly inclined with respect to said air inlet flow.

11. The vehicle power system as recited in claim 10 wherein said air generation means comprises an air compressor.

12. The vehicle power system as recited in claim 11 including second fan means operatively coupled with said air compressor and fluidly communicating at a first frontal air intake at the front of said vehicle.

13. The vehicle power system as recited in claim 12 including third fan means operatively coupled with said electrical generation means and fluidly communicating at a second frontal air intake at the front of said vehicle.

14. The vehicle power system as recited in claim 7 wherein said constant speed is in the range of about 600 to 1500 revolutions per minute.

15. The vehicle power system as recited in claim 7 wherein said constant speed is in the range of about 800 to 1000 revolutions per minute.

16. The vehicle power system as recited in claim 7 wherein said air intake means includes inlets mounted at the front of the vehicle and fluidly connected with said air fan means by the side surfaces and lower surfaces of said vehicle.

17. A vehicle power system, comprising: a vehicle having drive wheels; an internal combustion engine carried by said vehicle for delivering power to a crankshaft; an air intake at the front on the vehicle; a radiator for said engine located remote from said air intake; first fan means rotatably supported on a first shaft in said air intake at the front of said vehicle, said fan means having radial fan blades disposed for generating a torque at said first shaft in direct response to air flow in said intake during forward travel of said vehicle; and first belt means for rotatably coupling said crankshaft of said internal combustion engine with said first shaft whereby said first shaft delivers said torque to said crankshaft during vehicle travel; and drive means operatively connecting said crankshaft of said internal combustion means with said drive wheels.

18. The vehicle power system as recited in claim 17 including electrical generation means operatively connected to said first shaft and said first belt means.

19. The vehicle power system as recited in claim 17 including fluid generation means operatively connected to said first shaft and said first belt means.

20. The vehicle power system as recited in claim 19 wherein said fluid generation means is a compressor.

21. The vehicle power system as recited in claim 20 wherein said compressor is an air compressor.

22. A vehicle power system, comprising: a vehicle having drive wheels; an internal combustion engine carried by said vehicle for delivering power to a crankshaft; an air intake at the front of the vehicle; first fan means rotatably supported on a first shaft in said air intake at the front of said vehicle; a radiator coupled with said engine and located rearwardly of said first fan means; first belt means for rotatably coupling said crankshaft of said internal combustion engine with said first shaft, said first fan means including radial fan blades disposed for generating a torque on said first shaft in response to airflow in said air intake during forward travel of the vehicle whereby said first fan means provides supplemental power to said crankshaft during vehicle travel; drive means operatively connecting said crankshaft of said internal combustion means with said drive wheels; second belt means connected with said crankshaft of said internal combustion means, fluid generation means rotatably supported on a second shaft in said air intake, said second shaft being rotatably coupled with second belt means, and second fan means rotatably supported on a second shaft rotatably coupled with said second belt means and said fluid generation means.

23. A vehicle power system, comprising: a vehicle having drive wheels; an internal combustion engine carried by said vehicle for delivering power to a crankshaft; an air intake at the front on the vehicle; fan means rotatably supported in said air intake at the front of said vehicle having fan elements disposed for generating a torque in response to air flow through said air intake during forward vehicle travel; a radiator for supplying coolant to said engine, said fan means positioned in front of said radiator and providing frontal air flow to the radiator; and first drive means for rotatably coupling said crankshaft of said internal combustion engine with fan means to provide supplemental power to said crankshaft during vehicle travel; and second drive means operatively connecting said crankshaft of said internal combustion means with said drive wheels.

24. The vehicle power system as recited in claim 23 wherein said fan means include a first fan and a second fan positioned in side by side relationship in said air intake.

25. The vehicle power system as recited in claim 24 wherein an auxiliary device for providing power for an auxiliary function on said vehicle has an output shaft commonly operatively connected with at least one of said fan means.

26. The vehicle power system as recited in claim 25 wherein said auxiliary device is one of an alternator or a fluid generator.

27. A supplemental power system for a vehicle having an internal combustion engine carried by said vehicle for delivering power to a crankshaft; said system comprising: an air intake at the front on the vehicle; fan means rotatably supported on the vehicle in said air intake for receiving non-restricted air flow during vehicle travel and rotatably coupled to said crankshaft, said fan means including fan elements impacted by said air flow and disposed for generating a torque for delivery to said crankshaft during vehicle travel.

28. A vehicle power system, comprising: a vehicle having drive wheels; an internal combustion engine carried by said vehicle for delivering power to a crankshaft; an air intake at the front on the vehicle; fan means rotatably supported in said air intake at the front of said vehicle having fan elements disposed for generating a torque in response to air flow through said air intake during forward vehicle travel wherein said fan means include a first fan and a second fan positioned in side by side relationship in said air intake; and drive means for rotatably coupling said crankshaft of said internal combustion engine with fan means to provide supplemental power to said crankshaft during vehicle travel; and drive means operatively connecting said crankshaft of said internal combustion means with said drive wheels.

29. The vehicle power system as recited in claim 28 wherein said drive means provides a drive ratio of less than 1:1 between rotational speeds of said crankshaft and said fan means.

30. The vehicle power system as recited in claim 28 wherein said drive means comprise belt driven components.

31. The vehicle power system as recited in claim 29 wherein said drive ratio is greater than about 1:2.

32. The vehicle power system as recited in claim 31 wherein said drive means couples said first fan with said second fan and said first fan with said crankshaft.

33. The vehicle power system as recited in claim 32 wherein the drive ratio between said first fan and said second fan is less than 1:1.

* * * * *